United States Patent [19]

Davis et al.

[11] 4,359,570

[45] Nov. 16, 1982

[54] COLORED POLYESTER CONTAINING COPOLYMERIZED DYES AS COLORANTS

[75] Inventors: Thomas G. Davis; Max A. Weaver, both of Kingsport, Tenn.

[73] Assignee: Eastman Kodak Company, Rochester, N.Y.

[21] Appl. No.: 315,105

[22] Filed: Oct. 26, 1981

Related U.S. Application Data

[63] Continuation-in-part of Ser. No. 265,524, May 20, 1981, abandoned, which is a continuation-in-part of Ser. No. 147,978, May 8, 1980, abandoned.

[51] Int. Cl.$^3$ .............................................. C08G 69/44
[52] U.S. Cl. ............................... 528/289; 523/507; 523/508; 524/89; 524/90; 524/271; 524/219; 524/239; 524/240; 525/35; 528/127; 528/290; 528/295
[58] Field of Search ............... 528/127, 289, 290, 295; 8/647; 525/35; 524/89, 90, 271, 219, 239, 240, 289; 523/507, 508

[56] References Cited

U.S. PATENT DOCUMENTS

| | | | |
|---|---|---|---|
| 3,372,138 | 3/1968 | Bowman et al. | 260/40 R |
| 3,424,708 | 1/1969 | Bowman et al. | 260/40 R |
| 3,668,277 | 6/1972 | Riemhofer et al. | 525/443 |
| 3,927,964 | 12/1975 | Botros | 260/40 R |
| 4,191,679 | 3/1980 | Okita et al. | 260/40 R |

FOREIGN PATENT DOCUMENTS

| | | |
|---|---|---|
| 1450575 | 8/1966 | France . |
| 838716 | 6/1960 | United Kingdom . |
| 852646 | 10/1960 | United Kingdom . |

OTHER PUBLICATIONS

Kunststoffhandbuch, vol. VIII, Polyester, 1973, Carl Hanser Verlag, München, pp. 250-261.
Encyclopedia of Polymer Science and Technology, vol. 11, 1969, Interscience Publishers, N.Y., pp. 139-153.

Primary Examiner—Lucille M. Phynes
Attorney, Agent, or Firm—Donald W. Spurrell; Daniel B. Reece, III

[57] ABSTRACT

Disclosed are colored polyester compositions containing copolymerized anthraquinone dyes as colorants, which compositions may be used, for example, for food packaging and to mold colored beverage bottles. The copolymerized dyes are thermally stable at the processing temperatures, and are colorfast and nonextractable. The useful dyes have the general formula:

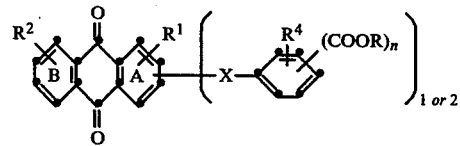

wherein either or both of rings A and B may contain in any position thereon one or two groups of the formula

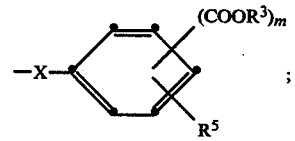

R and $R^3$ each is hydrogen, lower alkyl or lower hydroxyalkyl; $R^1$, $R^2$, $R^4$ and $R^5$ each is hydrogen or 1-3 substituents such as lower alkyl, lower alkoxy, phenyl, Cl, Br, or the like; X is —S— or —NH—; n is 1 or 2; m is 0, 1, or 2.

7 Claims, No Drawings

COLORED POLYESTER CONTAINING COPOLYMERIZED DYES AS COLORANTS

This is a continuation-in-part of application Ser. No. 265,524, now abandoned, filed May 20, 1981, which is a continuation-in-part of application Ser. No. 147,978, filed May 8, 1980, now abandoned.

This invention relates to colored polyester compositions containing copolymerized anthraquinone dyes as colorants, which compositions may be used, for example, for food packaging and to mold colored beverage bottles. The copolymerized dyes are thermally stable at the processing temperatures, and are colorfast and nonextractable.

The dyes useful in the present invention have the general formula:

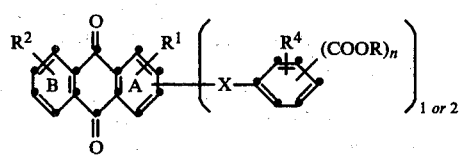

wherein either or both of rings A and B may contain in any position thereon one or two groups of the formula

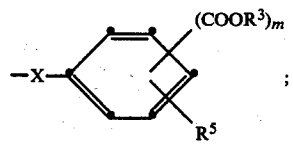

R and $R^3$ each is hydrogen, lower alkyl or lower hydroxyalkyl; $R^1$, $R^2$, $R^4$ and $R^5$ each represents hydrogen or 1–3 substituents selected from lower alkyl, lower alkyl substituted with lower alkoxy, phenyl, Cl, Br, or lower alkanoylamino, lower alkoxy, lower alkoxy substituted with lower alkoxy, phenyl, Cl, Br, or lower alkanoylamino, chlorine, bromine, amino, lower alkylamino, lower alkylamino substituted with lower alkoxy, cyclohexyl, phenyl, Cl, Br, or lower alkanoylamino, arylamino, arylthio, aroylamino, lower alkylsulfonyl, lower alkylthio, lower alkanoylamino, and cyclohexylamino, wherein each aforesaid aryl moiety is 6–10 carbons; X is —S— or —NH—; n is 1 or 2; and m is 0, 1, or 2. The term "lower" as used herein means 1–6 carbons.

The preferred dyes within the above definition are those in which at least one —COOR group is in the ortho position on each benzene ring with respect to the —X— linkage, and the most preferred have the formulas

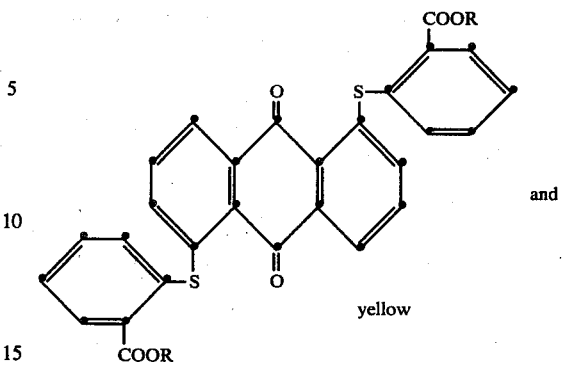

and

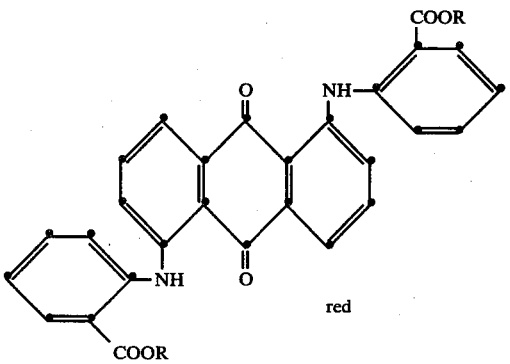

Brightly colored polyesters can be obtained by copolymerization with from about 1 ppm up to about 3.0 wt. % of one or more of the dyes, which polymers can be blown into bottles and/or molded or otherwise formed into many useful articles. A large variety of colors can be obtained with mixtures of the present dyes and also by mixing therewith various pigments including carbon black, copper phthalocyanine and $TiO_2$. An unexpected advantage is seen in the use of copper phthalocyanine in that the polymer preform or parison used in the blow molding of bottles heats up unusually rapidly. Also, fillers and the like may be admixed with the colored polymers to give certain effects supplementary to the dyes.

The dyes of this invention where —X— is —S— are in general prepared by reacting known halogen-containing anthraquinones with unsubstituted or substituted ortho, meta or para mercapto benzoic acids, or their lower alkyl esters. The compounds where —X— is —NH— are prepared by reacting anthraquinone intermediates containing groups easily displaced such as halogen, nitro, and hydroxyl, with ortho-, meta-, or para-aminobenzoic acids or their esters. The reactions may in general be carried out by heating a mixture of the halogenated anthraquinone compound with a mercaptobenzoic acid or aminobenzoic acid or their esters, in solvents such as N,N-dimethylformamide, N,N-dimethylacetamide, or N-methyl-2-pyrrolidinone, in the presence of an acid acceptor such as an alkali metal carbonate. Appropriate halogenated anthraquinone intermediates suitable for use in this invention include 1-chloroanthraquinone, 2-chloranthraquinone, 1,5-dichloroanthraquinone, 1,8-dichloroanthraquinone, 1,4-dichloroanthraquinone, 2,6-dichloroanthraquinone, 1-bromo-2-methylanthraquinone, 1-bromo-2-methoxyanthraquinone, 1-bromo-4-methylaminoanthraquinone, 1-amino-4-bromo-2-methoxyanthraquinone, 1-amino-4- anilino-2-bromoanthraquinone, 1-amino-4-bromo-2-methylsulfonylanthraquinone, 1,5-diamino-4,8-dichloroanthraquinone, 4,5-diamino-1,8-dihydroxy-2,6-dibromoanthraquinone, 1,4,5,8-tetrachloroanthraquinone, 1,4-diamino-5,8-dichloroanthraquinone, 1,4-diamino-6-chloroanthraquinone, 1amino-2,4-dibromoanthraquinone, 1-amino-4-bromo-2-chloroanthraquinone, 1-bromo-4-cyclohexylaminoanthraquinone, 1-bromo-4-phenylethylaminoanthraquinone, 2,6-dibromo-1,4,5,8-tetraminoanthraquinone, 1-amino-4-bromo-2-methylthioanthraquinone, and 1,4-diamino-2,3-dichloroanthraquinone.

The following examples will further illustrate the preparation and use of the dyes useful in the present invention.

EXAMPLE 1

Dye Preparation

A mixture of 1,5-dichloroanthraquinone (13.8 grams, 0.05 mole), o-mercapto benzoic acid (15.4 grams, 0.10 mole), potassium carbonate (13.8 grams, 0.10 mole), and N,N-dimethylformamide (200 ml) was heated at approximately 125° C. for four hours. The reaction mixture was allowed to cool to room temperature and then drowned into water (500 ml) and acidified with acetic acid to a pH of about 5.0. The dye was collected by filtration, washed with hot water, and then dried in air to yield 23.5 grams of 1,5-bis(2-carboxyphenylthio)anthraquinone.

EXAMPLE 2

Preparation of 1,5-Bis(o-carboxyanilino)anthraquinone

A mixture of 1,5-dichloroanthraquinone (12.0 g.), anthranilic acid (37.0 g.), magnesium oxide (3.2 g.), cupric oxide (0.8 g.), potassium hydroxide (15.0 g.), water (60 ml), and isobutyl alcohol (6 ml) was heated in an autoclave at 150° C. for 20 hrs. The reaction mixture was diluted with 500 ml water, acidified with sulfuric acid (15 ml), and then heated to 80°-85° C. with stirring. After cooling, the product was collected by filtration and washed with water. The dried product was purified by recrystallization from N-methyl-2-pyrrolidinone. This product is one of the most preferred comonomers.

EXAMPLE 3

Copolymerizing the Dye into Polyester 145.5 grams (0.75 mole) dimethyl terephthalate
89.0 grams (1.44 moles) ethylene glycol
32.8 grams (0.23 mole) 1,4-cyclohexanedimethanol
120.0 ppm Ti catalyst
200.0 ppm yellow dye 1,5-bis(2-carboxyphenylthio)tanthraquinone The above ingredients were added to a 500-ml round-bottom flask fitted with a stirrer, condensate take-off, and nitrogen inlet head. The flask and contents were immersed in a Woods metal bath at approximately 170° C. The temperature was raised to 195° C. and maintained for two hours and twenty minutes while ester exchange and esterification of the dimethyl terephthalate, ethylene glycol, 1,4-cyclohexanedimethanol, and 1,5-bis(2-carboxyphenylthio)anthraquinone took place. The temperature was then raised to 285° C. During all of the above reactions, a nitrogen purge of approximately two cubic feet/hour was maintained over the reactants. At 285° C., the melt was placed under 0.10 mm vacuum and polymerization was continued for 50 minutes. The resulting polymer was a brilliant yellow and had an inherent viscosity of 0.739 in a 60/40 ratio by weight of phenol/tetrachloroethane solvent. In like manner any of the dyes described above may be copolymerized with the polymer to yield brightly colored specimens such as yellow, blue, red, or amber.

Preferred copolyesters for green beverage bottles are prepared from dimethyl terephthalate, ethylene glycol, up to about 5 mole % of diethylene glycol based on moles of ethylene glycol, and from about 10 to about 300 ppm of 1,5-bis(2-carboxyphenylthio)anthraquinone, having an I.V. of from about 0.55 to about 0.85. These copolyesters preferably are blended with from about 5 to about 200 ppm of the blue pigment, copper phthalocyanine, known also as Pigment Blue 15. The most preferred of these compositions for green beverage bottles contains in copolymerized form from about 150 to about 250 ppm of 1,5-bis(2-carboxyphenylthio)anthraquinone, having an I.V. of from about 0.6 to about 0.72, admixed with from about 60 to about 88 ppm of the aforesaid Pigment Blue 15. This pigment may be blended with the finished polymer melt or can be added at any stage of the ester interchange or polycondensation reaction. In addition, red and blue dyes may be used in conjunction with yellow to yield amber polymer.

It is noted that where the dye is monofunctional, it acts as a chain terminator in known manner. Other specific dyes according to the above general formula are shown in the following tables.

TABLE I

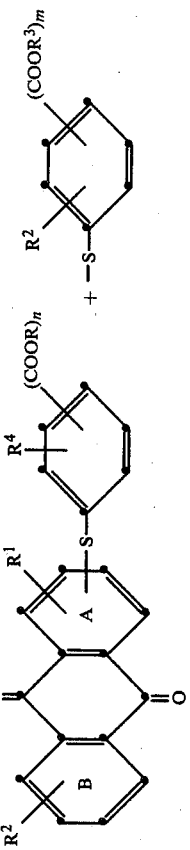

| Ex. No. | Position of $R^4$ —S— | Position of $R^5$ —S— | Position of —COOR | Position of —COOR$^3$ | R | R$^3$ | R$^1$ | R$^2$ | R$^4$ | R$^5$ |
|---|---|---|---|---|---|---|---|---|---|---|
| 4 | 1 | 8 | p | p | H | H | H | H | H | H |
| 5 | 2 | 6 | p | p | CH$_3$ | CH$_3$ | H | H | H | H |
| 6 | 1,4 | — | o | — | H | — | 1-NHCH$_3$ | H | H | H |
| 7 | 4 | — | o | — | H | — | 1-NH$_2$ | H | H | H |
| 8 | 2,4 | — | o | — | H | — | 2-CH$_3$ | H | H | H |
| 9 | 1 | — | m | — | C$_2$H$_5$ | — | 1-NH$_2$—2-OCH$_3$ | H | H | H |
| 10 | 4 | — | o | — | H | — | 1-NH$_2$—4-NHC$_6$H$_5$ | H | H | H |
| 11 | 2 | — | o | — | H | — | 2-CH$_3$ | H | H | H |
| 12 | 1,4 | 5,8 | o | o | H | H | H | H | p-CH$_3$ | H |
| 13 | 1 | 5,8 | o | o | H | H | 4-NH$_2$ | H | p-CH$_3$ | p-Cl |
| 14 | 1 | 6 | p | p | H | CH(CH$_3$)$_3$ | 4-NH$_2$ | H | H | p-OCH$_3$ |
| 15 | 1 | — | o | — | H | — | H | H | H | H |
| 16 | 4 | — | o | — | H | — | 1-NH$_2$—2-Cl | H | p-Cl | H |
| 17 | 4 | — | o | — | H | — | 1-NHC$_6$H$_5$ | H | H | H |
| 18 | 4 | — | o | — | H | — | 1-NHC$_2$H$_4$C$_6$H$_5$ | H | p-NH$_2$ | H |
| 19 | 2 | — | o | — | H | — | 1,4-di-NH$_2$ | H | H | H |
| 20 | 2 | 7 | o | o | H | H | 1-NH$_2$—4-OH | 5,8-di-NH$_2$ | H | H |
| 21 | 2 | 6 | o | o | H | — | 1-NH$_2$—2-SCH$_3$ | 5-NH$_2$—8-OH | H | H |
| 22 | 4 | — | o | — | H | — | 1-NH$_2$—2-SO$_2$CH$_3$ | H | p-CH$_2$NHCOCH$_3$ | H |
| 23 | 1 | 5 | p | p | CH$_3$ | CH$_3$ | H | H | p-SO$_2$CH$_3$ | o-Cl |
| 24 | 1 | 5 | m | m | CH$_3$ | CH$_3$ | H | H | H | H |
| 25 | 1 | 5 | o | o | C$_2$H$_4$OH | C$_2$H$_4$OH | H | H | H | H |
| 26 | 1 | 5 | p | p | C$_4$H$_9$-n | C$_4$H$_9$-n | H | H | H | H |
| 27 | 1 | 5 | p | p | CH$_3$ | CH$_3$ | 1-NH$_2$ | H | p-OCH$_3$ | H |
| 28 | 2,4 | — | o | — | H | — | 1-NH$_2$ | H | H | H |
| 29 | 2,4 | — | o | — | CH$_3$ | CH$_3$ | 1-NHC$_6$H$_5$ | H | H | H |
| 30 | 4 | — | o | — | H | — | H | H | H | H |
| 31 | 1 | — | o, p | — | H | — | H | H | H | H |
| 32 | 2 | 8 | o, p | p | CH$_3$ | CH$_3$ | H | H | H | H |
| 33 | 1,4 | 6 | o, m | p | H | H | H | H | H | H |
| 34 | 4 | — | o, m | — | H | — | H | H | H | H |
| 35 | 2,4 | — | o, p | — | C$_2$H$_5$ | — | H | H | H | H |
| 36 | 1 | — | m, p | — | H | — | H | H | H | o-SCH$_3$ |
| 37 | 4 | 6 | m, p | o, p | H | H | 1-NHCH$_3$ | H | H | H |
| 38 | 4 | — | o | — | H | — | 1-NH$_2$ | H | H | H |
| 39 | 1 | 4 | o | o | H | H | 1-NH$_2$—2-OCH$_2$CH$_2$Cl | H | H | H |

TABLE II

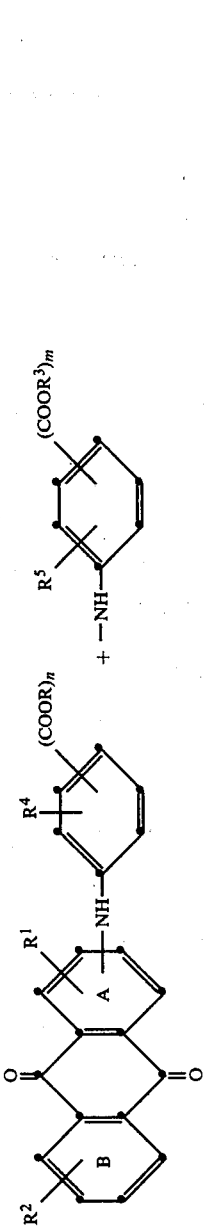

| Ex. No. | Position of —NH— (COOR)ₙ | Position of —NH R⁵ (COOR³)ₘ | Position of —COOR | Position of —COOR³ | R | R³ | R¹ | R² | R⁴ | R⁵ |
|---|---|---|---|---|---|---|---|---|---|---|
| 40 | 1 | 8 | p | p | H | H | H | H | H | H |
| 41 | 2 | 6 | p | p | CH₃ | CH₃ | H | H | H | H |
| 42 | 1,4 | — | o | — | H | — | H | H | H | H |
| 43 | 4 | — | o | — | H | — | 1-NHCH₃ | H | H | H |
| 44 | 2,4 | — | m | — | C₂H₅ | — | 2-CH₃ | H | H | H |
| 45 | 1 | — | o | — | H | — | 1-NH₂—2-OCH₃ | H | H | H |
| 46 | 2 | — | o | — | H | — | 1-NH₂—4-NHC₆H₅ | H | H | H |
| 47 | 1,4 | 5,8 | o | o | H | H | 4-NH₂ | H | p-CH₃ | p-Cl |
| 48 | 1 | 5,8 | p | p | H | CH(CH₃)₃ | 4-NH₂ | H | p-CH₃ | p-OCH₃ |
| 49 | 1 | 6 | o | — | H | — | H | H | p-Cl | H |
| 50 | 4 | — | o | — | H | — | 1-NH₂—2-Cl | H | p-NH₂ | H |
| 51 | 4 | — | o | — | H | — | 1-NHC₆H₁₁ | H | H | H |
| 52 | 4 | — | o | — | H | — | 1-NHC₂H₄C₆H₅ | H | H | H |
| 53 | 4 | — | o | — | H | — | 1,4-di-NH₂ | 5,8-di-NH₂ | p-CH₂NHCOCH₃ | H |
| 54 | 2 | 5 | o | — | H | — | 1,4-di-NH₂ | 5-NH₂—8-OH | p-SO₂CH₃ | H |
| 55 | 2 | 7 | o | o | H | H | 1-NH₂—4-OH | H | H | o-Cl |
| 56 | 4 | 6 | o | — | H | — | 1-NH₂—2-SCH₃ | H | H | H |
| 57 | 2 | — | o | — | H | — | 1-NH₂—2-SO₂CH₃ | H | H | H |
| 58 | 2 | 5 | o | p | CH₃ | CH₃ | H | H | H | H |
| 59 | 4 | 5 | m | m | CH₃ | H | H | H | H | H |
| 60 | 1 | 5 | p | o | CH₃ | CH₃ | H | H | H | H |
| 61 | 2 | 5 | o | p | C₂H₄OH | C₂H₄OH | H | H | H | H |
| 62 | 2 | 5 | p | p | C₄H₉—n | C₄H₉—n | H | H | H | H |
| 63 | 1 | — | p | — | CH₃ | — | 1-NH₂ | H | p-OCH₃ | H |
| 64 | 1 | — | o | — | H | — | 1-NH₂ | H | H | H |
| 65 | 2,4 | 8 | o, p | p | CH₃ | CH₃ | 1-NHC₆H₅ | H | H | H |
| 66 | 2,4 | 6 | o, m | p | H | H | H | H | H | H |
| 67 | 4 | — | o, p | — | CH₃ | — | H | H | H | H |
| 68 | 1 | — | o, p | — | H | — | 1-NHCH₃ | H | H | H |
| 69 | 1,4 | — | m, p | — | H | — | 1-NH₂ | H | H | H |
| 70 | 4 | 6 | m, p | — | C₂H₅ | — | H | H | H | H |
| 71 | 2,4 | — | o | — | H | — | 1-NH₂—2-OCH₂CH₂Cl | H | H | o-SCH₃ |
| 72 | 1 | 4 | — | o, p | H | H | H | H | H | H |

The useful types of polyesters, saturated and cross-linkable, are those disclosed for example in U.S. Pat. Nos. 2,465,319, 3,668,277, 3,560,445 and Br. 578,079. Exemplary are those produced from one or more diols such as 1,4-bis(hydroxymethyl)cyclohexane; ethylene glycol; 1,2-propanediol; 1,3-butanediol; 1,2-butanediol, 2,3-butanediol; 1,3-butanediol; 1,4-butanediol; 2,2-dimethyl-1,3-propanediol; 2,3-propanediol; 1,6-hexanediol; 2-ethylhexanediol; 1,2-cyclohexanediol; 1,4-cyclohexanediol; 1,2-bis(hydroxymethyl)cyclohexane; 1,3-bis(hydroxymethyl)cyclohexane; x,8-bis-(hydroxymethyl)tricyclo[5.2.1.0]-decane wherein x represents 3, 4 or 5; and diols containing one or more oxygen atoms in the chain, e.g., diethylene glycol, triethylene glycol, dipropylene glycol or tripropylene glycol. In general, useful diols contain two to 18, preferably two to 12 carbon atoms. Cycloaliphatic diols can be employed in their cis or trans configuration or as a mixture of both forms.

The acids used to form the polyester component of, for example, molding or coating compositions may comprise one or more cyclic or acyclic dicarboxylic acids. The term "acid" as used herein to define a polyester reactant includes its anhydride or other reactive species such as esters or the like. Examples of suitable aromatic and cycloaliphatic dicarboxylic acids are terephthalic acid, isophthalic acid, hexahydroterephthalic acid, tetrahydrophthalic acid, hexahydrophthalic acid, hexahydroisophthalic acid, as well as endomethylene and endoethylenetetrahydrophthalic acid, hexachloro-endomethylenetetrahydrophthalic acid or tetrabromophthalic acid. The cycloaliphatic dicarboxylic acids can be employed in their trans or cis configuration or as a mixture of both forms. The use of dicarboxylic acids wherein the carboxyl groups are arranged in the 1,2- or in the 1,3-position is preferred. Especially preferred are those dicarboxylic acids wherein the carboxyl groups are arranged in the 1,2-position. Of these, phthalic acid and hexahydrophthalic acid are especially preferred. In general, the cyclic dicarboxylic acids contain eight to 12 carbon atoms, preferably eight to 10 carbon atoms. The carbocyclic dicarboxylic acids are preferred, especially the monocyclic carboxylic, e.g., wherein the ring is a benzene, cyclohexane or bridged cyclohexane ring. Also useful, for example, are succinic, glutaric, adipic, suberic, sebacic, decanedicarboxylic, 2,2,4-trimethyladipic acid, maleic, fumaric, itaconic and citraconic acids. In place of the cyclic and/or acyclic dicarboxylic acids themselves, it is possible and often preferable to use a functional acid derivative thereof. For example, insted of the free dicarboxylic acids, esters thereof with lower-alkanols can also be employed, e.g., the dimethyl, diethyl or dipropyl ester. The anhydrides of the dicarboxylic acids can likewise be employed, e.g., phthalic anhydride, hexahydrophthalic anhydride, tetrahydrophthalic anhydride, succinic anhyride, glutaric anhydride and maleic anhydride.

The polyesters can be produced according to conventional processes, e.g., with or without a catalyst, with or without the introduction of an inert gas stream, as solution condensation in a solvent, as a melt condensation or azeotroic esterification, at temperatures of up to about 250° C., or higher so that the water or alkanol produced by the esterification is continuously removed. The esterification takes place almost quantitatively and can be followed by measuring the hydroxyl and acid numbers. The esterification temperature may be selected so that the losses of readily volatile substances remain small, i.e., during at least the first period of the esterification, the process is conducted at a temperature below the boiling point of the lowest-boiling starting substance.

With regard to the unsaturated, curable, polyesters, these are the polyesterification products of one or more dihydric alcohols and one or more unsaturated dicarboxylic acids or their anhydrides, and the term "polyester resin" is used herein to define the unsaturated polyester dissolved in, or cross-linked with, an ethylenically unsaturated monomer. Typical is the polyesterification product of (a) 1,4-cyclohexanedimethanol and/or 2,2-dimethyl-1,3-propanediol and optionally an additional dihydric alcohol, such as ethylene glycol, and (b) maleic acid or fumaric acid or the anhydride of maleic acid, and an unsaturated hydrogenated aromatic dicarboxylic acid, which when crosslinked with an ethylenically-unsaturated monomer, e.g. styrene, produces a polyester resin which has, for example, high thermal resistance, high heat distortion values, excellent electrical and mechanical properties, and excellent resistance to chemicals.

The unsaturated polyesters may be prepared in the presence of gelation inhibitors such as hydroquinone or the like, which are well known in the art of polyesterification. The esterification may be carried out for example under an inert blanket of gas such as nitrogen in a temperature range of 118°-220° C. for a period of about 6-20 hours until an acid number below 100 and preferably below 50 is obtained, based on milliequivalents of KOH necessary to neutralize 1 gram of the polyester. The resulting polyesters may be dissolved in and subsequently copolymerized with any of the well-known ethylenically unsaturated monomers used as solvents and copolymerizable monomers for polyesters. Examples of such monomers include styrene, alpha-methyl styrene, vinyl toluene, divinyl benzene, chlorostyrene, and the like as well as mixtures thereof.

The unsaturated polyester may be prepared for example from one or more dihydric alcohols, fumaric or maleic acid or anhydride, and up to about 60 mole percent of total acid component of o-phthalic, isophthalic or terephthalic acids or anhydrides. Preferred for the dihydric alcohol component is one or more of propylene glycol, neopentyl glycol, 2,2,4-trimethyl-1,3-pentanediol, ethylene glycol, and diethylene glycol. A preferred unsaturated polyester is preferred from propylene glycol, and as the acid component, o-phthalic anhydride and maleic anhydride in a mole ratio of from about ½ to about 2/1.

The present anthraquinone dye components comprise coloring amounts, i.e., from about 1.0 to about 5,000 and preferably about 2.0 to about 1500 parts of each dye per million parts of polyester. The novel colored polymers of the present invention are linear thermoplastic or unsaturated cross-linkable polyesters, containing a coloring amount of the residue of one or more of the dyes within the above general formula. Preferred are the linear thermoplastic polyesters having an I.V. of from about 0.4 to about 0.8, the acid moiety of which comprises at least about 5 mole percent terephthalic acid residue, and the glycol moiety of which comprises at least about 50 mole percent ethylene glycol or 1,4-cyclohexanedimethanol residue, and containing from about 2.0 to about 1500 parts per million of one or more of the above copolymerized dyes.

An especially preferred polyester is prepared from dimethyl terephthalate, ethylene glycol which may contain up to about 5 mole % of diethylene glycol, and from 0 to about 30 mole % of 1,4-cyclohexanedimethanol based on total moles of glycol, containing from about 2.0 to about 1500 parts of one or more of the above copolymerized dyes per one million parts of polyester and particularly of the dye 1,5-bis(2-carboxyphenylthio)anthraquinone.

The invention has been described in detail with particular reference to preferred embodiments thereof, but it will be understood that variations and modifications can be effected within the spirit and scope of the invention.

We claim:

1. Colored polyester composition comprising a linear thermoplastic or unsaturated cross-linkable polyester containing a coloring amount of a dye component comprising the copolymerized residue of one or more dyes of the formula

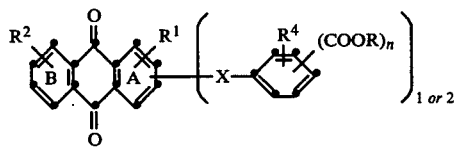

wherein either or both of rings A and B may contain in any position thereon one or two groups of the formula

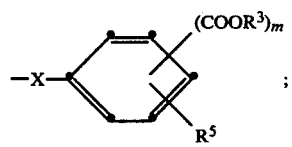

R and $R^3$ each is hydrogen, lower alkyl or hydroxy substituted lower alkyl; $R^1$, $R^2$, $R^4$ and $R^5$ each represents hydrogen or 1-3 substituents selected from lower alkyl, lower alkyl substituted with lower alkoxy, phenyl, Cl, Br, or lower alkanoylamino, lower alkoxy, lower alkoxy substituted with lower alkoxy, phenyl, Cl, Br, or lower alkanoylamino, chlorine, bromine, amino, lower alkylamino, lower alkylamino substituted with lower alkoxy, cyclohexyl, phenyl, Cl, Br, or lower alkanoylamino, arylamino, arylthio, aroylamino, lower alkylsulfonyl, lower alkylthio, lower alkanoylamino, and cyclohexylamino, wherein each aforesaid aryl moiety is 6-10 carbons; X is —S— or —NH—; n is 1 or 2; m is 0, 1, or 2; and wherein from about 5 to about 200 parts of copper phthalocyanine is admixed therewith, said parts being per million parts of polyester.

2. The composition of claim 1 wherein the dye component is 1,5-bis(2-carboxyphenylthio)anthraquinone or 1,5-bis(o-carboxyanilino)anthraquinone or mixtures thereof, each being present in a concentration of from about 1.0 part per million to about 3.0 percent by weight of the polyester.

3. The composition of claim 2 wherein the polyester is prepared from dimethyl terephthalate and a diol component comprising ethylene glycol and, based on total moles of diol, from 0 to about 30 mole % of 1,4-cyclohexanedimethanol, and up to about 5 mole % of diethylene glycol, each dye is present in reacted form in a concentration of from about 2.0 to about 1500 parts per million parts of polyester.

4. The composition of claim 1 wherein the polyester is unsaturated and is prepared from one or more diols, fumaric or maleic acid and up to about 60 mole percent of total acid component of one or a mixture of o-phthalic, isophthalic, and terephthalic acids, and wherein each dye is present in reacted form in a concentration of from about 2.0 to about 1500 parts per million parts of polyester.

5. The composition of claim 4 wherein the diol component comprises one or more of propylene glycol, neopentyl glycol, 2,2,4-trimethyl-1,3-pentanediol, ethylene glycol, and diethylene glycol.

6. The composition of claim 5 wherein the diol is propylene glycol and the acid component comprises in a mole ratio of from about ½ to about 2/1 o-phthalic anhydride and maleic anhydride.

7. The composition of claim 1, wherein the dye component comprises one or both of the dyes of the formulae

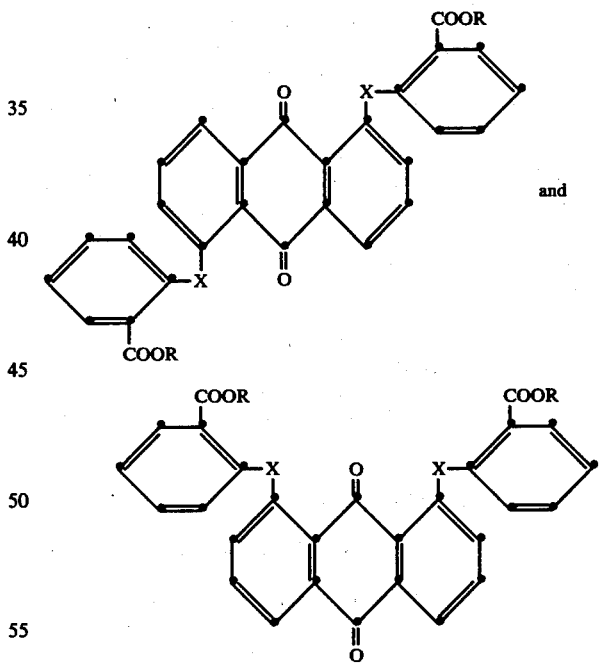

wherein X and R are as defined therein.

* * * * *